United States Patent
Shoji

(10) Patent No.: US 7,952,752 B2
(45) Date of Patent: May 31, 2011

(54) IMAGE FORMING APPARATUS AND METHOD WHICH MULTICOLOR PRINTS USING AN ELECTROPHOTOGRAPHIC PROCESS

(75) Inventor: Atsushi Shoji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1217 days.

(21) Appl. No.: 11/447,861

(22) Filed: Jun. 7, 2006

(65) Prior Publication Data

US 2006/0279791 A1    Dec. 14, 2006

(30) Foreign Application Priority Data

Jun. 9, 2005    (JP) .................................. 2005-170048

(51) Int. Cl.
G06F 15/00 (2006.01)
G06K 1/00 (2006.01)
H04N 1/60 (2006.01)

(52) U.S. Cl. ........................................ 358/1.9; 358/1.18

(58) Field of Classification Search .................. 358/1.9, 358/1.18, 1.6, 1.11, 3.06, 3.1, 540, 3.02, 358/3.09, 3.29

See application file for complete search history.

(56) References Cited

U.S. PATENT DOCUMENTS 7,362,467 B1 * 4/2008 Tsukimura ..................... 358/1.9
7,661,791 B2 * 2/2010 James et al. ................... 347/49

FOREIGN PATENT DOCUMENTS

JP      6-130656        5/1994
JP      2002-127507 A   5/2002

OTHER PUBLICATIONS

English translation of JP 2002-127507, filed May 8, 2002.

* cited by examiner

*Primary Examiner* — Douglas Q Tran
(74) *Attorney, Agent, or Firm* — Fitzpatrick, Cella, Harper & Scinto

(57) ABSTRACT

An image forming apparatus which performs multicolored printing by overlaying a plurality of printing materials using an electrophotographic process is provided. The apparatus includes a generation unit configured to generate bitmapped data of each of the plurality of printing materials, a detection unit configured to compare bitmapped data of a first printing material and of a second printing material of the plurality of printing materials to detect an overlapping area in which the first and second printing materials overlap, and a control unit configured to decrease the supply amount of the first or second printing material in the overlapping area.

10 Claims, 7 Drawing Sheets

K PLANE

Y PLANE

IDEAL PRINT IMAGE

K/Y OVERLAPPING PORTION

K/Y OVERLAPPING PORTION IS DELETED FROM Y PLANE

▨ PROCESSING TARGET AREA
(MISREGISTRATION CORRESPONDING TO LESS THAN ONE PIXEL)

▧ NON-PROCESSING AREA

IMAGE FORMING APPARATUS AND METHOD WHICH MULTICOLOR PRINTS USING AN ELECTROPHOTOGRAPHIC PROCESS

FIELD OF THE INVENTION

The present invention relates to an image forming apparatus and method and, more particularly, to an image forming apparatus and method which perform multicolored printing by overlaying printing materials of a plurality of colors using an electrophotographic process.

BACKGROUND OF THE INVENTION

In the field of color printing, it is well known that in order to obtain stable grayscale expression, portions coated with pigments are arranged in a square lattice array, and the tilt angles of the lattices of the respective color screens are made different from each other. Portions coated with pigments are called halftone dots. In color printing, if halftone dots are overlaid while the tilt angles of the respective color screens are the same, since the mutual positional relationship between the halftone dots is constant, screen misalignment directly causes color variations, resulting in unstable color appearance. For this reason, the tilt angles of the halftone dots are changed for the respective color screens, and the mutual positional relationship between the halftone dots between different color screens are made to differ from each other. As a consequence, the color screens slightly shift from each other, thereby canceling out variations in the overlay amount of the halftone dots due to the slight misalignment of the color screens (see, for example, Japanese Patent Laid-Open No. 6-130656).

There is a demerit in changing the tilt angles of halftone dots. When halftone dots are tilted, since the horizontal and vertical axis periods of the halftone dots differ from each other, a period until the mutual relationship between the halftone dots of the respective color screens returns to the same position is visually recognized as a characteristic pattern (moiréfringes).

In an electrophotographic printer, a potential image optically drawn on a photosensitive body is developed with a charged pigment, the developed image is transferred onto a paper sheet, and the image is fixed with heat and pressure, thereby performing printing. In contrast to this, in conventional printing, ink is applied to an image on a printing plate with a physically irregular surface or an image formed on a plane using a hydrophobic/hydrophilic pattern, and the plane is brought into tight contact with a paper sheet, thereby transferring the image onto the paper sheet. On printed matter, a solvent, containing a pigment, mostly volatilizes and leaves the pigment. In contrast, in the case of the electrophotographic printing scheme, an entire resin containing a pigment called toner remains as an adhesive for joining a paper sheet and the pigment. As a result, the volume of a substance remaining on the printed surface of a printout from a electrophotographic printer is larger than that in the conventional printing method. That is, a resin component remains to some thickness. In addition, when color printing is to be performed by the electrophotographic scheme, such resin components are overlaid.

A merit of a dry printing scheme is that there is no need to perform drying and processing for a solvent which has volatilized upon drying.

In the electrophotographic scheme of overlaying resin components having volumes, the following problem arises.

The following problem arises because in the electrophotographic printing scheme, heat and pressure are applied to fix a pigment. A resin having a thickness is spread flat upon application of pressure thereon (spread phenomenon). The area of the resin spread becomes conspicuous as the thickness increases. That is, this phenomenon becomes more conspicuous at a portion where pigments overlap in color printing. Owing to this phenomenon, the grayscale expression scheme is influenced by the coating ratio of a pigment on a paper sheet area of printed matter where fine grayscale expression is made. More specifically, as a pigment is spread, the coating ratio of the pigment increases, resulting in an increase in print density.

It is not uncommon that an actually printed area increases or decreases as a whole relative to a drawn area. However, a color output from an electrophotographic printer has inconstant spread areas, and a portion where more toners overlap spreads more. In a portion where halftone dots of different colors overlap, in particular, the area of pigments increases, and the density increases. As a result, a change in density due to interference between colors becomes conspicuous. Such a change in density sometimes appears as an interference pattern (process moiré) stronger than a color screen interference in the original printed matter. This problem becomes more conspicuous in a printing system using, in addition to four colors (cyan (C), magenta (M), yellow (Y), and black (K)), printing materials which have the same hues and different densities to improve the color reproducibility.

For this reason, in the electrophotographic scheme, it is hard to realize grayscale expression by the same scheme as in the general printing scheme. In the general printing scheme, a pattern like that shown in FIG. 7A is used. In contrast to this, the electrophotographic scheme alternatively uses a line screen like that shown in FIG. 7B, halftone dots arranged in a parallelogram like that shown in FIG. 7C instead of a rectangular lattice, or a grayscale expression in a random dot pattern like that shown in FIG. 7D. Selecting a texture like that shown in FIG. 7B or 7C in grayscale expression makes it possible to increase the stability of print quality and avoid a halftone dot interference between color screens.

If, however, such a pattern is used, the smoothness of the boundary of edges greatly changes depending on the angle viewed. In a pattern like that shown in FIG. 7D, pixels are isolated, and hence this grayscale expression is not suitable for the electrophotographic scheme.

In addition, since a texture as a grayscale expression differs from printed matter, it is difficult to partly replace part of commercial printing. In order to inherit conventional printing techniques, it is important to reproduce such print textures. Incapability to express an image equivalent to commercial printed matter in addition to a demerit of an expression texture makes it impossible to meet demands for emulation such as proofing of printed matter. If output textures differ for different output devices, it is difficult to make the qualities of outputs by on-demanding printing uniform. It is preferable that printout textures be uniform regardless of output devices.

SUMMARY OF THE INVENTION

In view of the above problems in the conventional art, the present invention has an object to provide an image forming apparatus and method which can stably obtain high-quality printed matter by suppressing an increase in visual density in a halftone dot overlapping portion in an electrophotographic process.

In one aspect of the present invention, an image forming apparatus which performs multicolored printing by overlaying a plurality of printing materials using an electrophotographic process is provided. This image forming apparatus includes a generation unit configured to generate bitmapped data of each of the plurality of printing materials, a detection unit configured to compare bitmapped data of a first printing material and of a second printing material of the plurality of printing materials to detect an overlapping area in which the first printing material and the second printing material overlap, and a control unit configured to decrease a supply amount of the first printing material or the second printing material in the overlapping area.

The above and other objects and features of the invention will appear more fully hereinafter from a consideration of the following description taken in connection with the accompanying drawings wherein one example is illustrated by way of example.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Preferred embodiments of the present invention will be described in detail in accordance with the accompanying drawings. The present invention is not limited by the disclosure of the embodiments and all combinations of the features described in the embodiments are not always indispensable to solving means of the present invention.

First Embodiment

Figure 1:
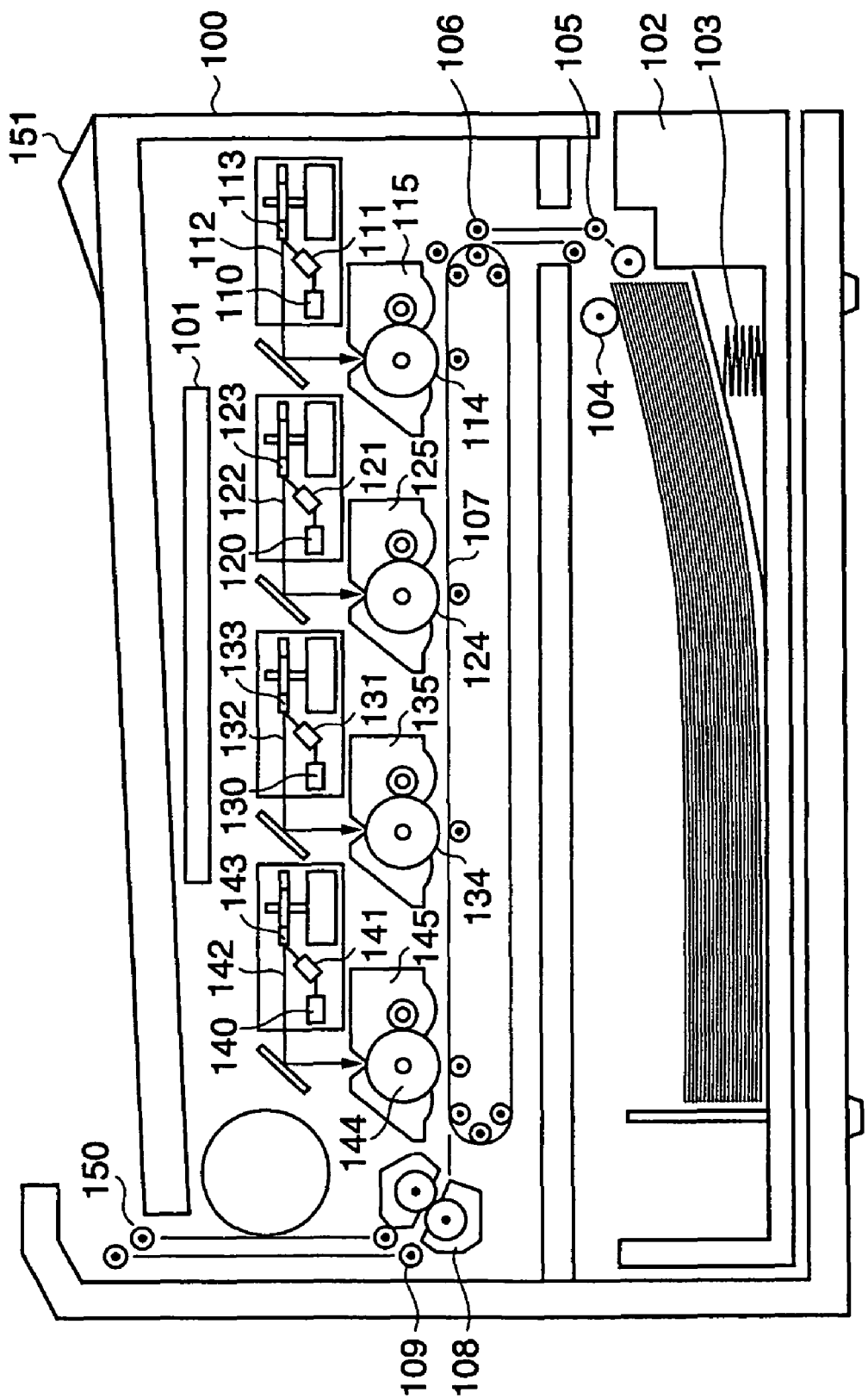
FIG. 1 is a view showing the arrangement of an image forming apparatus according to the first embodiment of the present invention.

FIG. 1 is a view showing the arrangement of an image forming apparatus according to this embodiment. An image forming apparatus 100 is an electrophotographic image forming apparatus, e.g., a laser beam printer (to be referred to as an "LBP" hereinafter).

In accordance with a character printing instruction, various kinds of graphical drawing instructions, an image drawing instruction, a color designation instruction, and the like supplied from an externally connected host computer, the LPB 100 generates corresponding character patterns, graphic patterns, images, and the like and forms images on printing sheets as printing media.

Reference numeral 151 denotes an operation panel on which switches for operation, an LED display device which displays the state of the LBP, an LCD display device, and the like are arranged; and 101, an image processing unit which performs image processing (to be described later) on the basis of image information. supplied from an external host computer.

The LPB 100 in this embodiment converts pieces of color information R (red), G (green), and B (blue) into pieces of information C (cyan), M (magenta), Y (yellow), and K (black). The LPB 100 comprises image forming/developing mechanisms (to be referred to as "printer engines" hereinafter) dedicated to C, M, Y, and K to sequentially perform image forming/developing operation for the respective colors. The image processing unit 101 generates C, M, Y, and K print images, converts them into video signals, and outputs them to laser drivers for C, M, Y, and K.

More specifically, for example, the printer engine for C comprises a laser driver 110, semiconductor laser 111, polygon mirror 113, electrostatic drum 114, and toner cartridge 115. The laser driver 110 is a circuit for driving the semiconductor laser 111. This circuit turns on/off a laser beam 112 emitted from the semiconductor laser 111 in accordance with an input video signal. The laser beam 112 is deflected to the right and left by the polygon mirror 113 to be scanned on the electrostatic drum 114. With this operation, an electrostatic latent image of a character or graphic pattern is formed on the electrostatic drum 114. This latent image is developed by the toner cartridge (developing unit) 115 which is located around the electrostatic drum 114 and stores toner (powder ink) as a developer. The resultant image is then transferred onto a printing sheet.

This apparatus also comprises printer engines for M, Y, and K equivalent to the printer engine for C described above. Reference numerals 120, 121, 122, 123, 124, and 125 denote components for the printer engine for M; 130, 131, 132, 133, 134, and 135, components for the printer engine for Y; and 140, 141, 142, 143, 144, and 145, components for the printer engine for K. Since the respective components have the same functions as those of the above printer engine for C, a description thereof will be omitted.

As a printing sheet, for example, a cut sheet is used. Cut sheets as printing sheets are stored in a paper feed cassette 102 mounted in the LPB 100, and are held at a predetermined level by a spring 103. The printing sheets stored in the paper feed cassette 102 are fed into the apparatus by a feed roller 104 and convey rollers 105 and 106, are placed on a paper feed convey belt 107, and pass through the printer engines for C, M, Y, and K.

C, M, Y, and K toners transferred onto a printing sheet are fixed thereto by heat and pressure by a fixing device 108. The printing sheet is output to the upper portion of the LPB 100 by convey rollers 109 and. 150.

Figure 2:
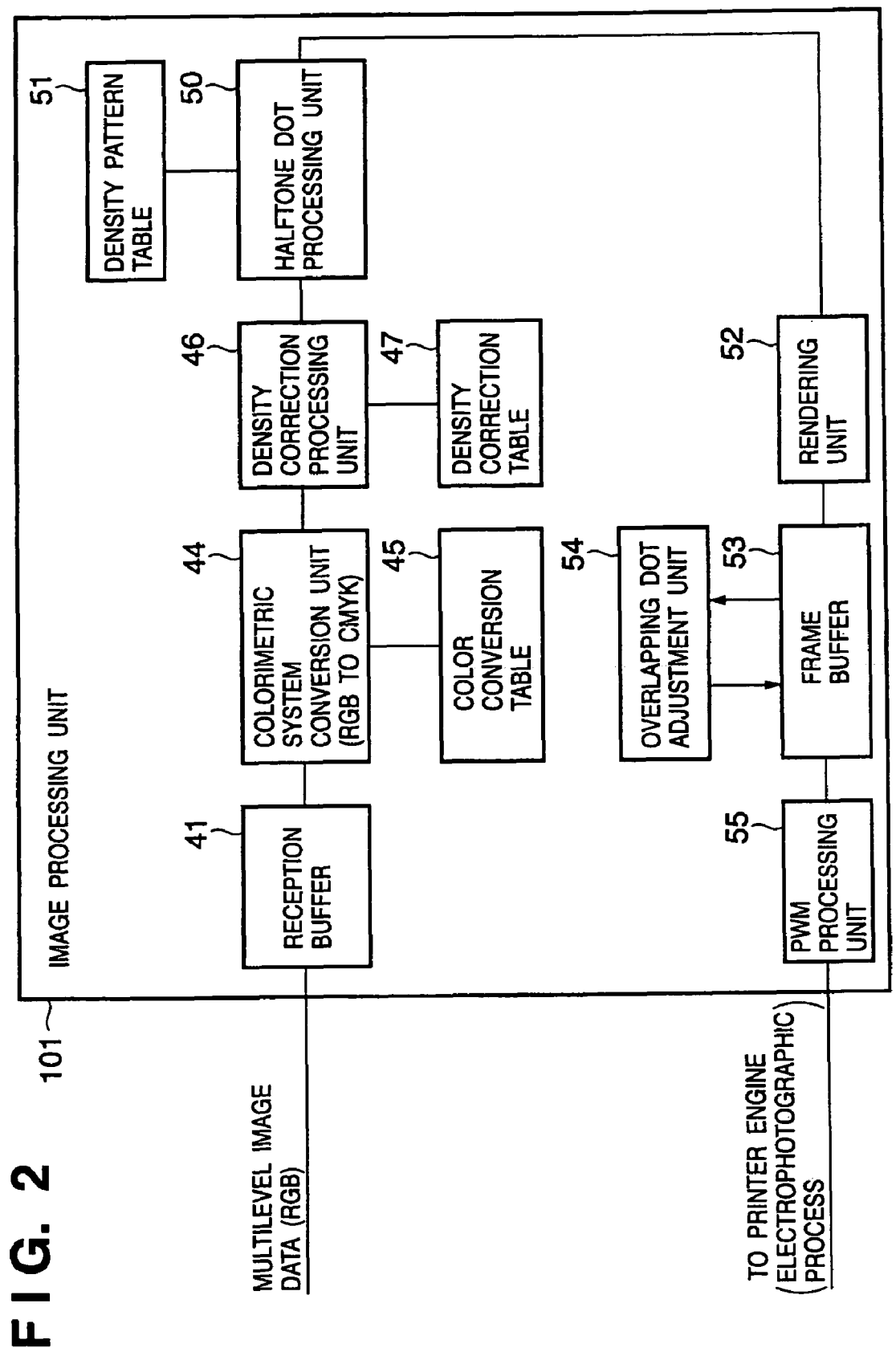
FIG. 2 is a block diagram showing an example of the functional arrangement of an image processing unit in the first embodiment of the present invention.

FIG. 2 is a block diagram showing an example of the functional arrangement of the image processing unit 101. The operation of the image processing unit 101 will be described with reference to FIG. 2.

Referring to FIG. 2, reference numeral 41 denotes a reception buffer which holds received R, G, and B multilevel image data; 44, a colorimetric system conversion unit which converts the R, G, and B image data held in the reception buffer 41 into C, M, Y, and K image data by referring to a color conversion table 45.

Reference numeral 46 denotes a density correction processing unit which performs linearization (γ correction) of density by using a density correction table 47 with respect to the C, M, Y, and K image data converted by the calorimetric system conversion unit 44.

Reference numeral 50 denotes a halftone dot processing unit as a halftone processing means which converts the C, M, Y, and K image data corrected by the density correction processing unit 46 into halftone dot image data by referring to a density pattern table 51.

As described above, a color image is formed by overlaying toners of the respective colors, i.e., C, M, Y, and K. As is well known, for example, the color appearance of a color image becomes unstable (changes for every printing operation) depending on the manner of overlaying the respective colors. In order to solve this problem, halftone dot processing in this embodiment, different screen angles are provided between the respective colors to obtain color uniformity in an average manner.

Reference numeral 52 denotes a rendering unit which stores the above halftone dot image data as bitmapped data in a frame buffer 53.

Reference numeral 54 denotes an overlapping dot adjustment unit which detects positions where dots overlap between specific colors with respect to the bitmapped data of the respective colors stored in the frame buffer 53, and adjusts the bitmapped data to avoid a spread phenomenon caused by the overlapping of dots as in the prior art. Processing in this case is an important feature of the present invention. A specific example of this processing will be described in detail later. The bitmapped data adjusted in this processing is stored in the frame buffer 53 again.

Reference numeral 55 denotes a PWM processing unit which receives the bitmapped data adjusted by the overlapping dot adjustment unit 54 from the frame buffer 53, performs modulation processing with a pulse width corresponding to the application time for laser exposure on the basis of a predetermined pulse width modulation pattern (also called "PWM emission pattern"), and sends out the resultant data to the printer engines which execute an electrophotographic process.

The above description is about the functional arrangement of the image processing unit 101 in this embodiment. Processing by the overlapping dot adjustment unit 54 will be described in detail next.

As described above, in this embodiment, color printing is performed by using toners (printing materials) of four colors, i.e., C, M, Y, and K. Note that K is classified into a dark color as the first color (first printing material), and the other colors, i.e., C, M, and Y are classified into light colors as the second colors (second printing materials). The terms "dark color" and "light color" with the above meanings will be used to facilitate the following description.

The overlapping dot adjustment unit 54 in this embodiment has two basic functions. One is to detect the overlapping state of K (black) which is a dark color as the first color and the second color which is a light color relative to the first color with respect to the bitmapped data stored in the frame buffer 53. The other is to suppress the light color which overlaps the dark color.

Since K is an absorption color, even if a light-colored toner at a portion where it overlaps K is suppressed, the essence of the printing scheme of performing printing by overlaying halftones is not impaired. It, however, should be noted that it is necessary to overlay light colors other than K, e.g., C (cyan) and M (magenta), in order to develop a purplish color. If toner suppression is performed even in such a case, unacceptable color variations may occur. For this reason, this embodiment will not exemplify a case wherein such light colors overlap. However, a spread phenomenon also occurs upon overlapping of light colors, and hence the suppression processing to be described below can be executed to such an extent that color variations fall within an allowable range. Obviously, if color variations caused by the method of this embodiment can be corrected, this technique can be used in combination with some other technique.

Figure 3A:
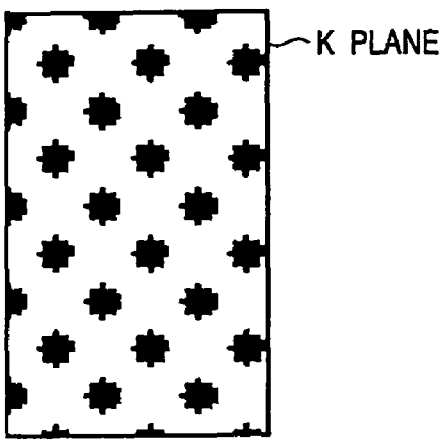
FIGS. 3A to 3E are views for explaining an outline of overlapping dot adjustment processing in the first embodiment of the present invention.
Figure 3B:
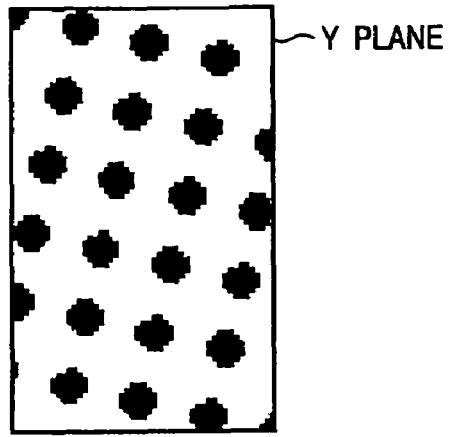
Figure 3C:
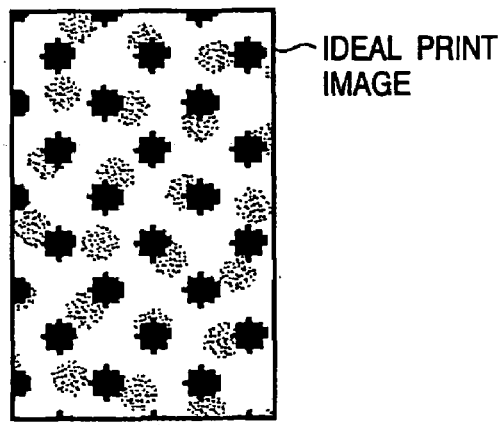

The contents of overlapping dot adjustment processing will be described below by exemplifying K as a dark color and Y as one of the light colors. FIGS. 3A to 3E show an outline of overlapping dot adjustment processing between K and Y. FIG. 3A shows an image of a K plane textured by halftone dot processing. FIG. 3B shows an image of a Y plane. A printout has a portion where K and Y overlap as in an "ideal print image" in FIG. 3C. In practice, however, such overlapping of K and Y causes the above "spread phenomenon". In some case, a "process moiré" may be caused by interference between halftone dots.

Figure 3D:
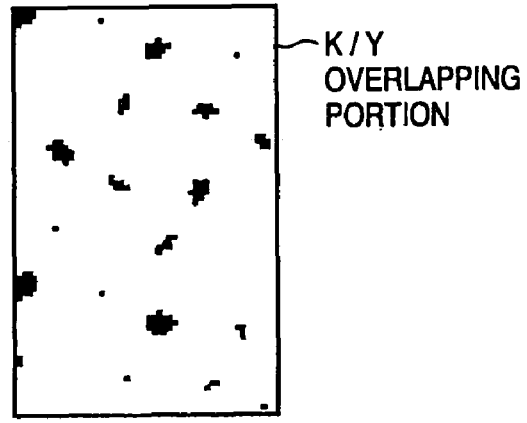
Figure 3E:
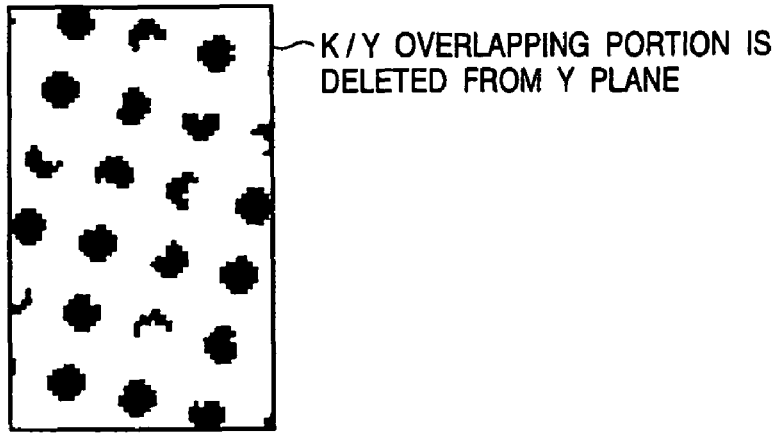

The overlapping dot adjustment unit 54 performs comparative computation of the textured bitmapped image to calculate an overlapping portion of K and Y like that shown in FIG. 3D. Thereafter, the overlapping dot adjustment unit 54 removes the data of the overlapping portion from the Y plane shown in FIG. 3B to suppress the Y toner on the overlapping portion. The resultant pattern (FIG. 3E) is stored as a Y texture after adjustment in the frame buffer 53 again. The bitmapped data of the Y plane adjusted in this manner is sent to the PWM processing unit 55 to be used for pulse width modulation. The resultant data is output to the printer engine. This makes it possible to decrease the supply amount of Y toner on the above overlapping portion in an electrophotographic process.

Figure 4:
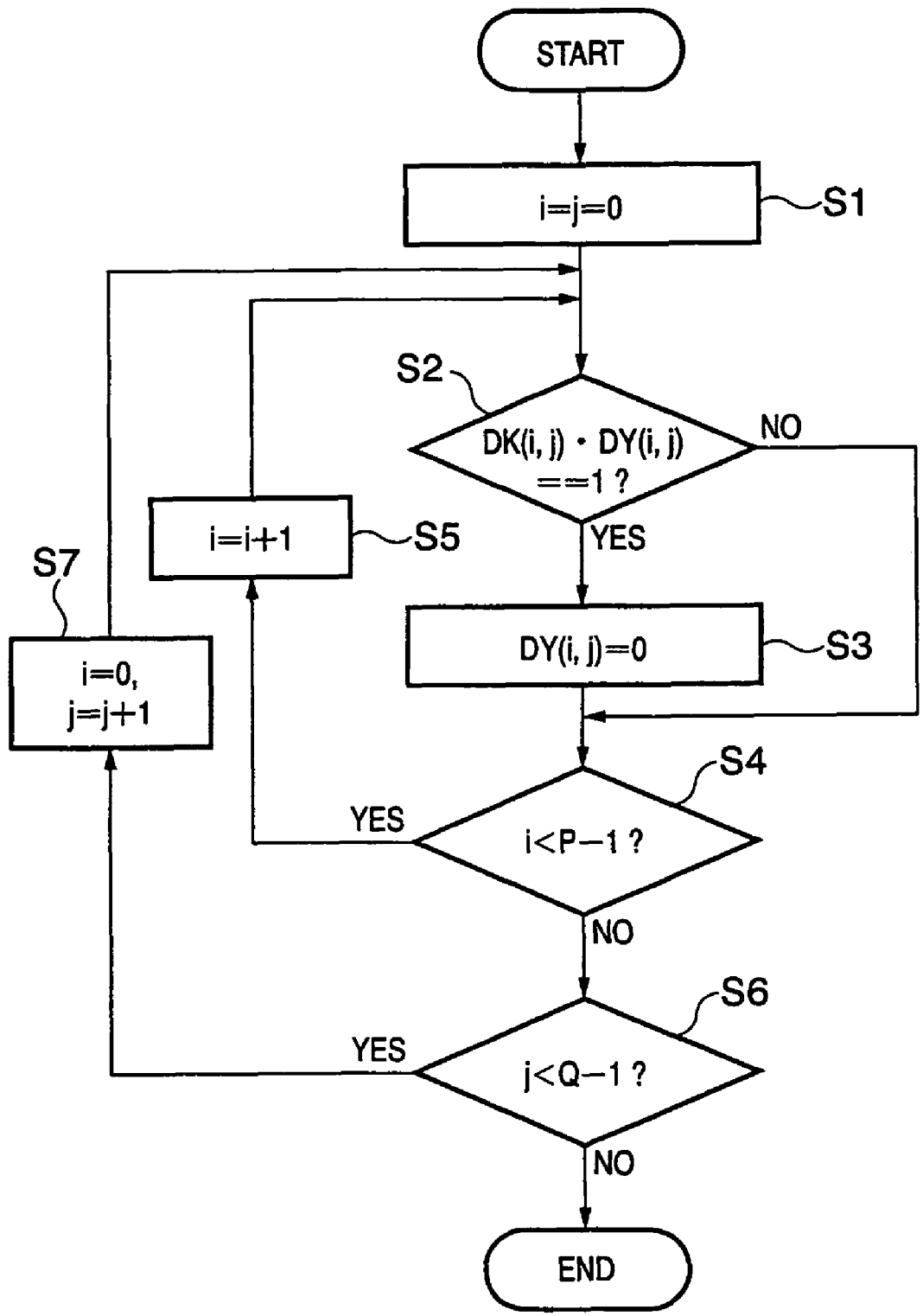
FIG. 4 is a flowchart showing a sequence for overlapping dot adjustment processing in the first embodiment of the present invention.

FIG. 4 is a flowchart showing an example of a specific sequence of realizing the above overlapping dot adjustment processing. Note that the mathematical expressions written in FIG. 4 conform to a notation like the C language. That is, the single equal sign "=" indicates that "the value of the right side is assigned to the left side", and the double equal sign "==" indicates that "the value of the left side is equal to the value of the right side".

First of all, variables i and j respectively indicating the pixel coordinate positions of the K and Y planes, stored in the frame buffer 53, in the main scanning direction and sub-scanning direction are initialized to 0 (step S1). The logical product between data DK(i,j) of the K plane and data DY(i,j) of the Y plane at coordinates (i,j), and determines whether the logical product is 1 (step S2). If this logical product is 1, it is determined that K and Y overlap at this coordinate position, and DY(i,j) is changed to 0 to suppress the Y toner at this coordinate position (step S3). If the logical product is 0, it is determined that K and Y do not overlap, DY(i,j) is not changed.

It is determined whether the position i of the processing target has come to the final pixel positions of the K and Y planes in the main scanning direction (in FIG. 4, P represents the number of pixels of the K and P planes in the main scanning direction). If the position i has not reached a final pixel position P−1, the variable i is incremented (step S5), and the flow returns to step S2 to repeat the processing. That is, the loop of steps S2 to S5 corresponds to 1-line processing.

If the processing up to the final pixel position is complete, the flow advances to step S6 to determine whether the position j of the processing target has come to the final pixel positions of the K and Y planes in the sub-scanning direction (in FIG. 4, Q represents the number of pixels of the K and Y planes in the sub-scanning direction). If the position j has not reached a final pixel position Q−1, the variable i is returned to 0, and the variable j is incremented (step S7). The flow then returns to step S2 to repeat the processing. Processing for all the pixels of the K and Y planes is performed by the loop of steps S2 to S7.

Although the overlapping dot adjustment processing has been described by exemplifying K and Y, similar overlapping dot adjustment can be applied to between K and another light color (i.e., K and C or K and M).

Performing such overlapping dot adjustment processing makes it possible to suppress overlapping of toners and suppress a density increase due to a spread phenomenon.

Second Embodiment

In an actual image forming apparatus, a positional shift between color screens cannot be avoided, which occurs due to the expansion and contraction of paper sheets and mechanical alignment errors. In a printer engine which performs printing while conveying paper sheets, positional shifts can occur in various directions within a plane due to convey speed fluctuations. In such a case, even if a portion where dots overlap is detected between bitmapped data of dark and light colors in the above manner, no overlapping of toners may actually occur at the detected portion owing to a positional shift (to be referred to as a "misregistration" hereinafter) between color screens. In such a case, if the light-colored toner is suppressed at the portion where no overlapping of toners has occurred, the image quality may deteriorate.

In this embodiment, therefore, only a portion where overlapping of toners between specific color screens reliably occurs at the occurrence of a misregistration is extracted, and the light-colored toner on this portion is suppressed.

In this embodiment, if it is determined in step S2 described above that a dark color and a light color overlap at a coordinate position of interest of the bitmapped data, it is further determined whether even if a misregistration occurs, the dark color and the light color overlap at the coordinate position of interest. If, for example, the halftone dot period is equal to or more than a misregistration tolerance, it is determined that toners reliably overlap at the coordinate position of interest, and suppression of the light-colored toner at the coordinate position of interest is executed. In contrast to this, if the halftone dot period is smaller than the misregistration tolerance, since it is undesirable that the dark-colored toner and the light-colored toner may not actually overlap at the coordinate position of interest due to a misregistration, suppression of the light-colored toner at the coordinate position of interest is not executed.

Figure 5A:
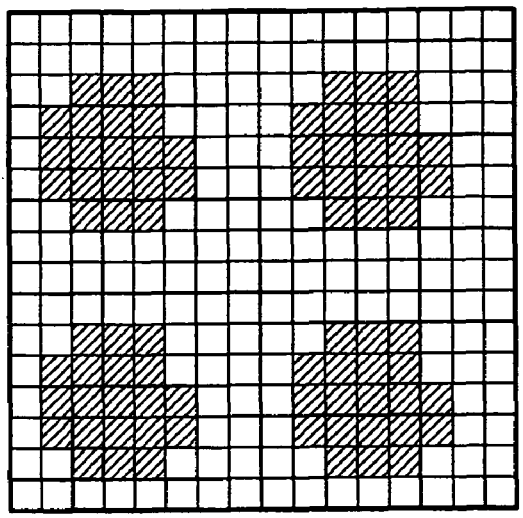
FIGS. 5A to 5D are views for explaining overlapping dot adjustment processing in consideration of a misregistration according to the second embodiment of the present invention.
Figure 5B:
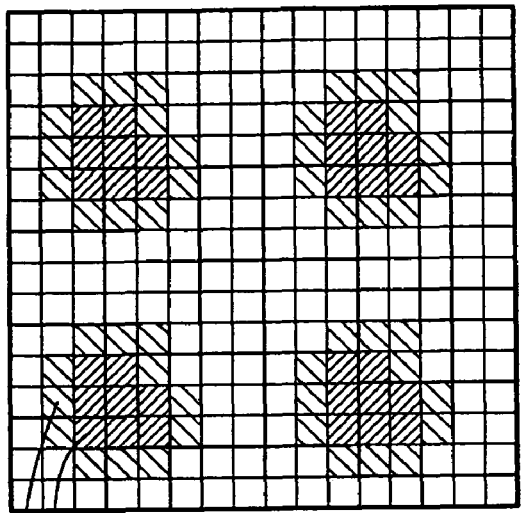

FIGS. 5A to 5D show an example (a case of K and Y). In the case shown in FIGS. 5A and 5B, it is assumed that the misregistration tolerance is less than one pixel. The halftone dot period shown in FIGS. 5A and 5B is eight pixels, which corresponds to 75 lines in a 600-dpi printer. It is determined that K and Y reliably overlap in the processing target area shown in FIG. 5B even at the occurrence of a misregistration, and hence Y should be suppressed in this area.

Figure 5C:
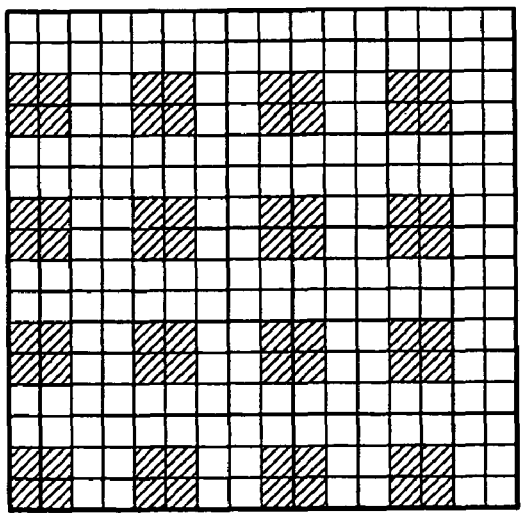
Figure 5D:
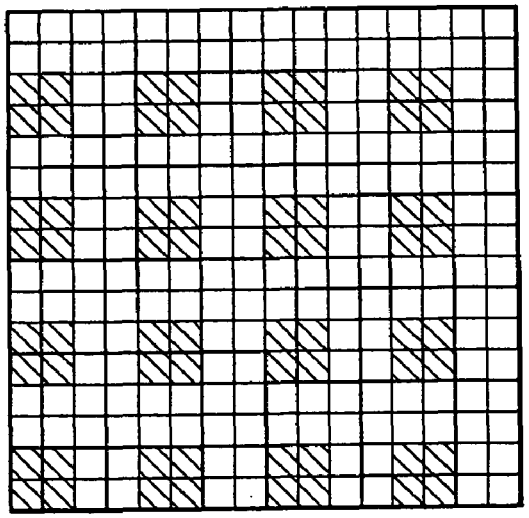

In the case shown in FIGS. 5C and 5D, it is assumed that the misregistration tolerance is about two pixels, and the halftone dot period is four pixels. Such a halftone dot period corresponds to 150 lines in a 600-dpi printer. In this case, there is no pixel at which K and Y may reliably overlap due to a misregistration, suppression of Y is not executed.

Figure 6:
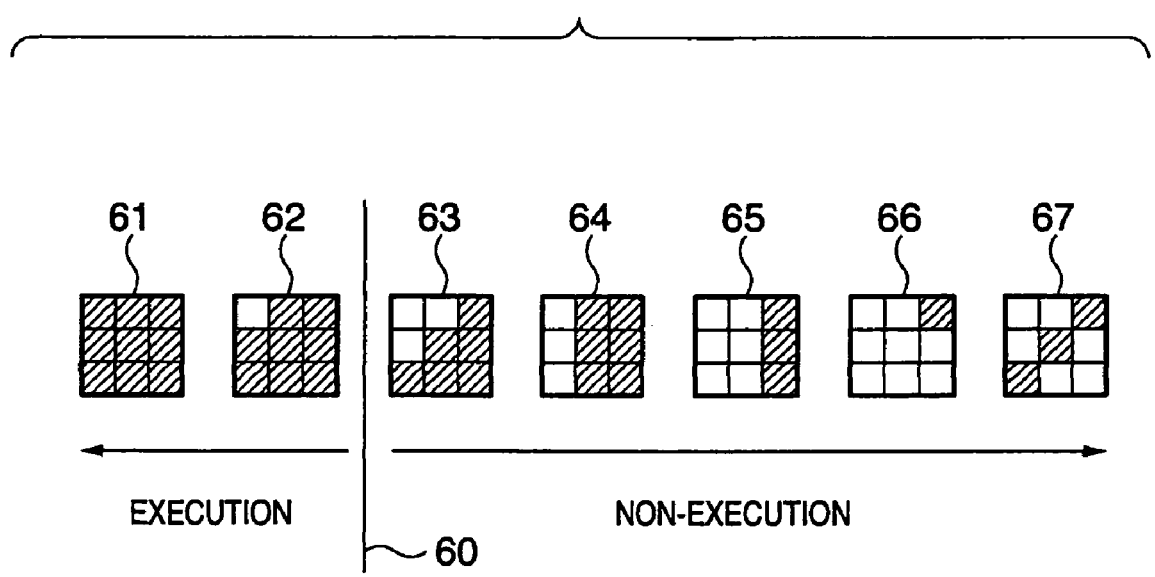
FIG. 6 is a view showing an example of patterns of neighboring pixels which realize overlapping dot adjustment processing in consideration of a misregistration according to the second embodiment of the present invention.
Figure 7A:
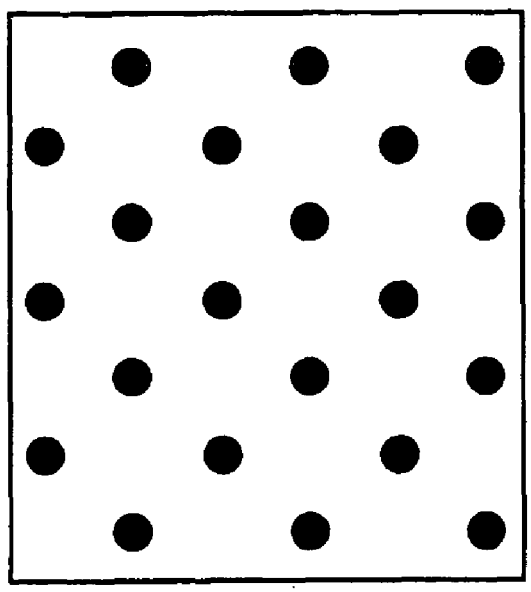
FIGS. 7A to 7D are views showing examples of various textures of printed matter.
Figure 7B:
Figure 7C:
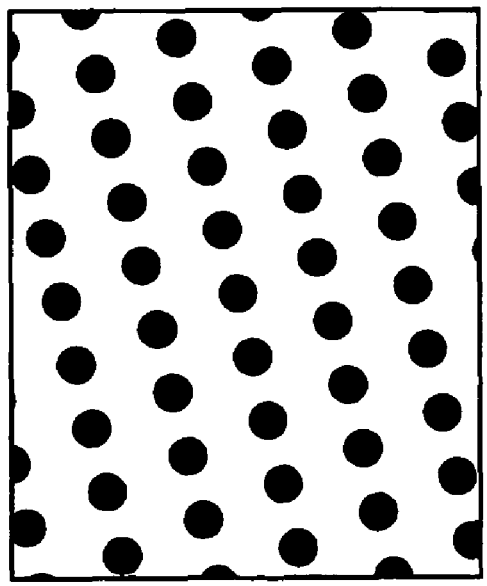
Figure 7D:
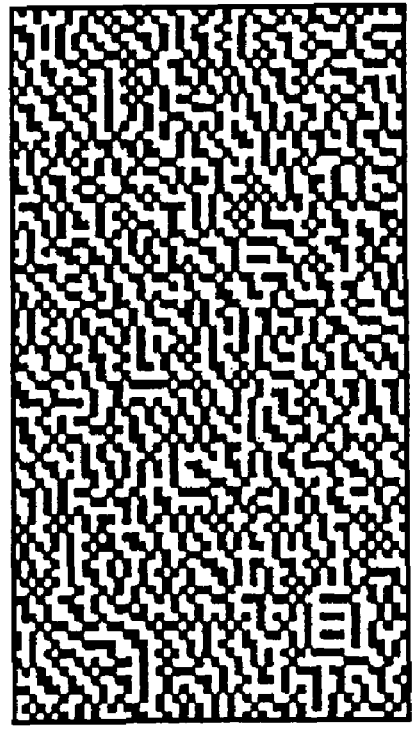

The above determination of execution/non-execution of suppression of a light-colored toner at an overlapping dot in consideration of a misregistration can be realized by referring to patterns of neighboring pixels. FIG. 6 shows an example of performing determination by using patterns of neighboring pixels each comprising 3×3 pixels. Assume that in each 3×3 pixel pattern, the center pixel is a pixel of interest. According to the patterns of neighboring pixels shown in FIG. 6, the proportion of white pixels increases to the right. For example, black pixels occupy most of patterns 61 and 62 of neighboring pixels. When such a pattern is observed, it can be determined that the pixel of interest does not exist at least near an edge of a drawn area. If, for example, a pattern of neighboring pixels like a pattern 65 or 66 is observed, it can be determined that the pixel of interest is likely to exist at an edge portion of a drawn area.

In this embodiment, therefore, a threshold 60 is set in advance for such patterns of neighboring pixels in consideration of a misregistration tolerance. Even if it is determined in step S2 in FIG. 4 that K and Y overlap at a pixel of interest, if the observed pattern of neighboring pixels is included in the patterns on the right side of the threshold 60 (i.e., if the pixel of interest is located at an edge portion of a drawn area), suppression of Y in step S3 is not executed. In this case, in practice, owing to a misregistration, K and Y may not overlap. If it is determined in step S2 that K and Y overlap at the pixel of interest, and the observed pattern of neighboring pixels is included in the patterns on the left side of the threshold 60 (i.e., the pixel of interest is not located at least at an edge portion of the drawn area), suppression of Y in step S3 is executed. This is because, in this case, K and Y are likely to overlap even upon occurrence of a misregistration.

With the above processing, overlapping dot adjustment processing is realized in consideration of a misregistration which can actually occur.

Other Embodiment

In the above embodiment, on a portion where overlapping of a dark color and a light color is detected, the light color data is uniformly replaced with 0 (i.e., deleted) to suppress the light-colored toner on the portion. However, this processing may cause a change in color appearance. In order to solve such a problem, the present invention may use another technique of suppressing light-colored toners instead of uniformly deleting light color data.

For example, a light-colored pixel located at an edge portion of a dark-colored portion in a dark color/light color overlapping area may be left instead of being deleted.

Alternatively, in a dark color/light color overlapping area, only light color data at odd-numbered or even-numbered coordinates may be replaced with 0, and the light color data at the remaining coordinates may be left.

Furthermore, the present invention may use a technique of diffusing light color data in the above overlapping area to its peripheral area instead of simply changing the light color data in the overlapping area to 0. More specifically, some or all pixels in an overlapping area from which light color data are deleted are arranged in a pixel area around the light-colored pixels. Obviously, this operation is based on the assumption that no dark-colored pixels exit at the pixel positions where light color data are to be arranged. Alternatively, the present invention may employ an arrangement in which data is input to an error diffusion processing circuit, an output from the error diffusion circuit is added to a bit image after deletion of a pixel of interest, and the resultant data is sent out to a printer engine. This operation compensates for a light-colored pixel texture deleted from an overlapping area.

Using the above light color suppression technique instead of uniformly deleting light color data in a dark color/light color overlapping area makes it possible to suppress an abrupt change in color appearance.

The above embodiment has exemplified the LBP designed to perform color printing by using toners of four colors, i.e., C, M, Y, and K. There is also available a model designed to use LC (light cyan) and LM (light magenta) which are lower in density than C and M. The above embodiment can also be applied to LC and LM as light colors with respect to a dark color (K). That is, in an overlapping area of LC or LM and K, the occurrence of a spread phenomenon can be avoided by suppressing LC and LM.

Alternatively, an entire area where LC or LM overlaps K may be replaced with C or M which is generally used. In such a case, in order to keep the density unchanged, such an LC or LM area is replaced with a smaller C or M area. This makes it possible to reduce the overlapping area of C or M and K upon replacement. Therefore, toner overlapping is suppressed, and an increase in density caused by a spread phenomenon can be suppressed.

Each embodiment described above has exemplified the suppression processing for a spread phenomenon in printing operation using four colors, i.e., C, M, Y, and K, or six colors, i.e., C, M, Y, K, LC, and LM, with K being a dark color and the remaining colors being light colors. However, this color classification is merely an example. In addition, the definitions of "dark color" and "light color" are used for the sake of convenience, and the present invention is not limited to only the combinations of the dark colors and the light colors used in the above embodiments. Obviously, it suffices to use printing materials other than those described in this embodiment (e.g., red and green) and a printing form using a transparent printing material. The present invention is not limited to the above color classification, and is properly applied to printing materials which change in density due to a spread phenomenon to solve the problem caused by the spread phenomenon.

As many apparently widely different embodiments of the present invention can be made without departing from the spirit and scope thereof, it is to be understood that the invention is not limited to the specific embodiments thereof except as defined in the claims.

This application claims the benefit of Japanese Patent Application No. 2005-170048 filed on Jun. 9, 2005, which is hereby incorporated by reference herein in its entirety.

What is claimed is:

1. An image forming apparatus which performs multicolored printing by overlaying a plurality of colors using an electrophotographic process, comprising:
a generation unit configured to generate bitmapped data of each of the plurality of colors;
a detection unit configured to compare bitmapped data of a first color and of a second color of the plurality of colors to detect an overlapping area in which the bitmapped data of the first color and of the second color overlap; and
a control unit configured to decrease a supply amount of a first printing material having the first color or a second printing material having the second color in the overlapping area based on the comparison of bitmapped data by said detection unit,
wherein said detection unit detects a misalignment amount between color screens for each of the printing materials, and detects an area where the first printing material and the second printing material overlap in accordance with the misalignment amount.

2. The apparatus according to claim 1, wherein, in a case where the second color is a light color in relation to the first color, said control unit decreases the supply amount of the second printing material having the second color in the overlapping area.

3. The apparatus according to claim 1, wherein said control unit decreases the supply amount of the first printing material having the first color or the second printing material having the second color by changing at least part of data of the first color or the second color in the overlapping area to 0.

4. The apparatus according to claim 1, wherein said detection unit detects a misalignment amount on the basis of a misregistration tolerance and a halftone dot period of the color screen.

5. The apparatus according to claim 1, wherein said detection unit detects a misalignment amount on the basis of a pattern of neighboring pixels with respect to a pixel of interest.

6. An image forming apparatus which performs multicolored printing by overlaying a plurality of colors using an electrophotographic process, comprising:
a generation unit configured to generate bitmapped data of each of the plurality of colors;
a detection unit configured to compare bitmapped data of a first color and of a second color of the plurality of colors to detect an overlapping area in which the bitmapped data of the first color and of the second color overlap; and
a control unit configured to decrease a supply amount of a first printing material having the first color or a second printing material having the second color in the overlapping area based on the comparison of bitmapped data by said detection unit,
wherein said control unit decreases the supply amount in the overlapping area by diffusing data of the first color or the second color to a peripheral area of the overlapping area.

7. An image forming method of performing multicolored printing by overlaying a plurality of colors using an electrophotographic process, comprising the steps of:
generating bitmapped data of each of the plurality of colors;
comparing bitmapped data of a first color and of a second color of the plurality of colors to detect an overlapping area in which the bitmapped data of the first color and of the second color overlap; and
decreasing a supply amount of a first printing material having the first color or a second printing material having the second color in the overlapping area based on the comparison of bitmapped data by said comparing step,
wherein said step of detecting the overlapping area comprises detecting a misalignment amount between color screens for each of the printing materials, and detecting an area where the first printing material and the second printing material overlap in accordance with the misalignment amount.

8. An image forming method of performing multicolored printing by overlaying a plurality of colors using an electrophotographic process, comprising the steps of:
generating bitmapped data of each of the plurality of colors;
comparing bitmapped data of a first color and of a second color of the plurality of colors to detect an overlapping area in which the bitmapped data of the first color and of the second color overlap; and
decreasing a supply amount of a first printing material having the first color or a second printing material having the second color in the overlapping area based on the comparison of bitmapped data by said comparing step,
wherein said decreasing step decreases the supply amount in the overlapping area by diffusing data of the first color or the second color to a peripheral area of the overlapping area.

9. The apparatus according to claim 1,
wherein if a halftone dot period of the color screen is equal to or more than the misalignment amount, said control unit executes the decrease of the supply amount of the first printing material having the first color or the second printing material having the second color in the overlapping area, and
wherein if a halftone dot period of the color screen is smaller than the misalignment amount, said control unit does not execute the decrease of the supply amount of the first printing material having the first color or the second printing material having the second color in the overlapping area.

10. The apparatus according to claim 1, wherein the second printing material is any one of yellow, light cyan, light magenta, and transparent toners.

* * * * *